UNITED STATES PATENT OFFICE.

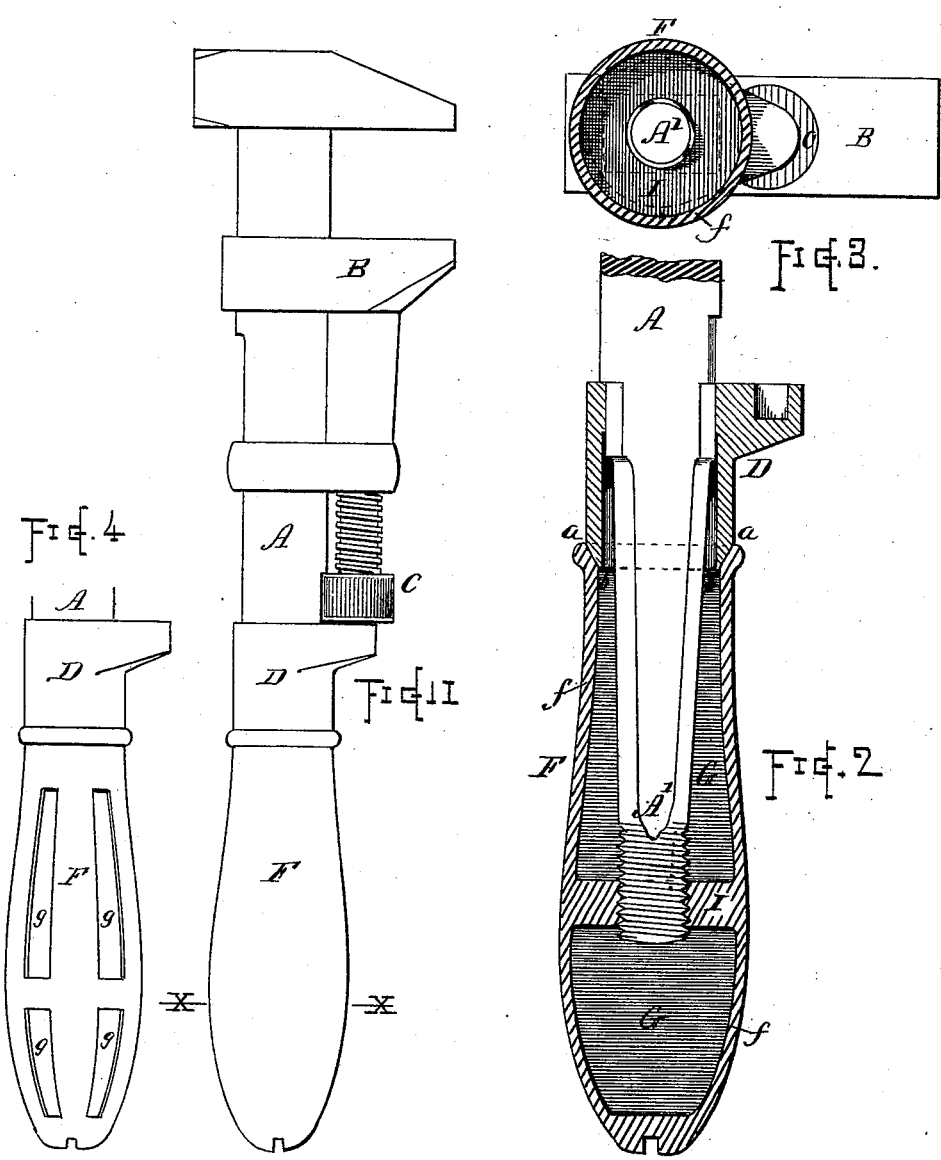

JOHN D. LOVELL, OF WORCESTER, MASSACHUSETTS, ADMINISTRATOR OF AURY G. COES, DECEASED, ASSIGNOR TO JOHN H. COES AND FRED. L. COES, OF SAME PLACE.

IMPROVEMENT IN WRENCHES.

Specification forming part of Letters Patent No. 189,366, dated April 10, 1877; application filed February 21, 1877.

*To all whom it may concern:*

Be it known that AURY G. COES, late of the city and county of Worcester, and State of Massachusetts, did invent certain new and useful Improvements in Wrenches; and I declare the following to be a description of said invention sufficiently full, clear, and exact to enable others skilled in the art to which it appertains to make and use the same, reference being had to the accompanying drawings, which form a part of this specification, and in which—

Figure 1 represents a side view of a wrench embracing said improvements. Fig. 2 represents a longitudinal section of the handle, enlarged; Fig. 3, a transverse section of the handle at line $x \, x$, Fig. 1; and Fig. 4, a modified form of handle.

This invention consists in the combination, with the bar and ferrule in a screw-wrench, of a handle of the improved construction hereinafter set forth.

In the drawings, A denotes the bar; B, the movable jaw; C, the rosette and screw; D, the ferrule, and F the handle. The bar, jaws, rosette, screw, and ferrule are made substantially of the ordinary form, the ferrule being provided with a beveled or conical end at $a$, and the bar somewhat shortened. The handle F is of metal, made with a thin cylindrical shell, $f$, with interior chambers G G, and having a central screw-threaded diaphragm, I, cast with and across the shell $f$, into which the end of the bar-shank A′ is screwed, the screw-threads being formed left-handed, so that the natural strain of the hand, when using the wrench, will tend to turn the handle tighter onto the bar, instead of unscrewing the parts. The upper end of the handle F is provided with a roll or flange, interiorly beveled, as at $b$, to fit the conical end $a$ of the ferrule D, whereby the parts are centered and locked together when the handle is screwed to position upon the shank, the ferrule being also thereby pressed upward, and sustained against the strain from the jaw B.

The handle thus formed obviates the necessity of using a pressure-nut under the ferrule, or a tip-nut at the end of the bar-shank.

The exterior surface of the handle may be formed full and smooth, as shown in Fig. 1; or, if preferred, it may be corrugated longitudinally, or perforated with openings $g$, as shown in Fig. 4.

What I claim, and desire to secure by Letters Patent, is—

In a screw-wrench, in combination substantially as shown and described, the bar A, having screw-threaded shank A′, ferrule D, provided with beveled or conical end $a$, and the hollow metallic handle F, having screw-threaded diaphragm I, and interior beveled surface $b$, fitting the beveled end of ferrule, as set forth.

J. D. LOVELL,
*Administrator of the Estate of*
*Aury G. Coes, deceased.*

Witnesses:
CHAS. H. BURLEIGH,
CHAS. B. STILWELL.